(No Model.)
E. WILDI.
SOLDERING IRON HEATER.
No. 438,967. Patented Oct. 21, 1890.
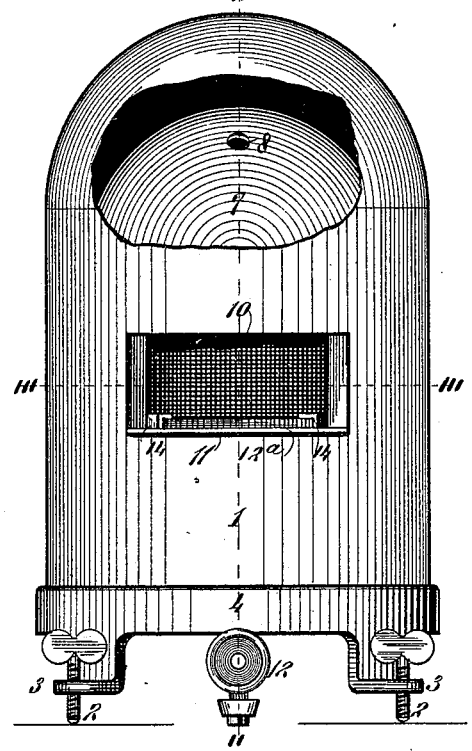
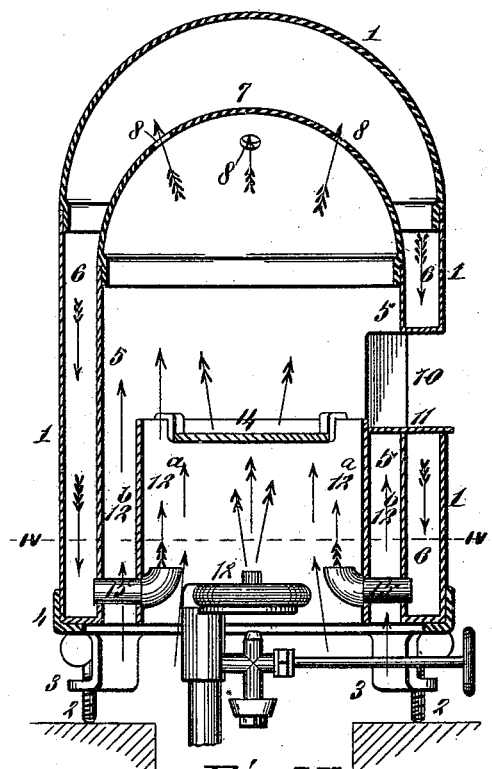
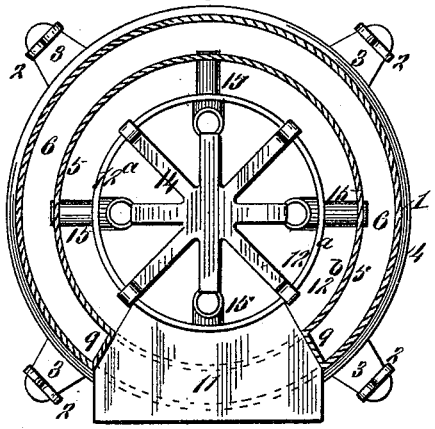
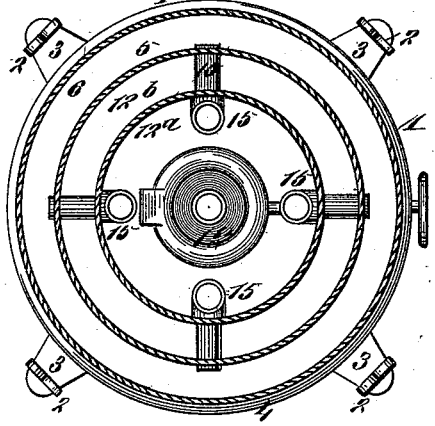
Attest:
S. H. Knight
E. Arthur
Inventor:
Emil Wildi
By Knight Bros
attys.

UNITED STATES PATENT OFFICE.

EMIL WILDI, OF HIGHLAND, ILLINOIS.

SOLDERING-IRON HEATER.

SPECIFICATION forming part of Letters Patent No. 438,967, dated October 21, 1890.

Application filed February 8, 1890. Serial No. 339,643. (No model.)

*To all whom it may concern:*

Be it known that I, EMIL WILDI, of Highland, in the county of Madison and State of Illinois, have invented a certain new and useful Improvement in Soldering-Iron Heaters, of which the following is a full, clear, and exact description, reference being had to the accompanying drawings, forming part of this specification.

My invention relates to an improved device for heating soldering-irons and the like; and my invention consists in features of novelty hereinafter fully described, and pointed out in the claims.

Figure I is a front elevation, part broken away, of my improved heater. Fig. II is a vertical section taken on line II II, Fig. I. Fig. III is a horizontal transverse section taken on line III III, Fig. I. Fig. IV is a similar view taken on line IV IV, Fig. II.

Referring to the drawings, 1 represents an outer shell or casing, supported, preferably, on set-screws 2, passing through lugs 3 of a base-piece 4, in which fits the casing 1. By adjusting these set-screws the inclination of the device may be changed, as desired. Within the casing 1 is a shell or wall 5, between which and the casing 1 is a hot-air chamber 6. This shell 5 has a dome top 7, provided with perforations 8. The walls of the shell 5 join the walls of the outer casing 1, as shown at 9, Fig. III, where an opening 10 is made in the outer casing through which the irons to be heated are placed, the bottom of the opening being provided with a table or ledge 11, upon which the irons rest as they are being heated.

12 represents a vapor-burner of any suitable construction, which is located in the bottom 13 of a shell $12^a$, and between which and the shell 5 an air-space $12^b$ is formed. On the shell $12^a$ on a line with the bottom of the opening 10 is a spider 14, through which the heat and products of combustion pass from the burner 12.

15 represents tubes, which pass through the shells 5 and $12^a$, as shown in Fig. II, forming a communication between the chamber 6 and the interior of the shell $12^a$. As the heated air passes from the burner and the space $12^b$ up above the spider 14, it passes on upward and escapes through the perforations 8 of the dome 7, from where it passes in a downwardly direction through the space 6, as shown by the arrows in Fig. II, and entering the tubes 15 passes inwardly and escapes from the tubes, as shown. This highly-heated air is brought into contact with the irons being heated.

A heater of this construction can be cheaply made, and is durable and effective in performing the functions for which it is intended.

I claim as my invention—

1. In a heater for soldering-irons, &c., in combination with the outer casing, an inner shell having a perforated dome, a burner, a burner-shell, and tubes communicating with the chamber formed by the inner shell and the casing, said tubes being open to permit the passage of the heat, substantially as and for the purpose set forth.

2. In a heater for soldering-irons, &c., the combination of an outer casing, a shell located within the outer casing and having a perforated top, an opening 10, communicating with the interior of the shell and provided with a table or ledge 11, a spider, a burner-shell upon which the spider is located, tubes 15, and a vapor-burner located beneath the spider, substantially as and for the purpose set forth.

EMIL WILDI.

In presence of—
CHAS. F. TUFFLI,
FRER. B. SUPPIGE.